US006295945B1

(12) United States Patent
Amanze

(10) Patent No.: US 6,295,945 B1
(45) Date of Patent: Oct. 2, 2001

(54) MULTIPURPOSE VEHICLE FLAG HOLDER

(76) Inventor: Charles Umunna Amanze, 27086 Belmont La., Southfield, MI (US) 48076

(*) Notice: Subject to any disclaimer, the term of this patent is extended or adjusted under 35 U.S.C. 154(b) by 0 days.

(21) Appl. No.: 09/161,515

(22) Filed: Sep. 28, 1998

(51) Int. Cl.[7] ............................ G09F 17/00; A01K 97/10
(52) U.S. Cl. .......................... 116/173; 116/28 R; 40/591; 248/511; 248/512
(58) Field of Search .......................... 116/173–175, 28 R, 116/30, 35 R, 42, 43, 44, 46, 51; 40/591, 592, 666, 658, 643; 248/512, 538, 539; 24/486, 569

(56) References Cited

U.S. PATENT DOCUMENTS

| | | | | |
|---|---|---|---|---|
| 454,553 | * | 6/1891 | Whitten | 24/486 |
| 1,443,945 | * | 2/1923 | Cappell | 116/28 R |
| 3,060,605 | * | 10/1962 | Flack | 40/591 |
| 3,166,199 | * | 1/1965 | Hawkins et al. | 248/538 |
| 3,493,203 | * | 2/1970 | Gualano | 248/539 |
| 3,563,200 | * | 2/1971 | Grossman | 33/264 |
| 3,643,902 | * | 2/1972 | Gualano | 248/539 |
| 3,762,360 | * | 10/1973 | Hawes | 116/28 R |
| 4,582,017 | * | 4/1986 | Ostermiller | 40/591 |
| 4,593,877 | * | 6/1986 | Van Der Wyk | 248/512 |

* cited by examiner

*Primary Examiner*—Andrew H. Hirshfeld

(57) ABSTRACT

The present invention pertains to a method of flying and a means of securing pennants, logos, flags or indicia on a vehicle. It is desired in some special cases to display pennants, logos, flags or indicia on a vehicle. The vehicle mounting bracket used for this purpose according to the present invention can secure said pennant, logo, flag or indicia, at one end, and at the other end be attached onto the door, trunk, hood or window of a vehicle. Further, the mounting bracket can secure the pole of a pennant, logo, flag or indicia onto a convertible car, nonconvertible car, van, truck, lorry, etc, in a vertical or horizontal position.

4 Claims, 3 Drawing Sheets

MULTIPURPOSE VEHICLE FLAG HOLDER

BACKGROUND OF THE INVENTION

1. Field of The Invention

The present invention relates generally to display of pennants, logos, flags or indicia. More particularly, the present invention relates to methods of displaying and means of securing pennants, logos, flags or indicia on a vehicle.

2. Background of The Arts

One method of showing support for a sports club, professional organization, political group or country is by flying pennants, logos, flags or indicia on a vehicle. Various patents have proposed different methods of securing a pennant, logo, flag or indicia on a vehicle. Each existing patent has its drawbacks and limitations.

U.S. Pat. Nos. 5,524,857 and 5,233,938 describe a vehicle window-mounted mast. One of the disadvantages of the vehicle window-mounted flag is the excessive noise they produce when the vehicle is in motion. The noise originates from two sources, (1) flapping of the flag by wind gust, and (2) road noise resulting from the fact that the door or window cannot be tightly shut. Another disadvantage of the vehicle window-mounted flag is the road hazard they could cause should the vehicle window be lowered when the vehicle is in motion. There is tendency for wind force to forcefully remove the flag from the window, thus causing a hazard for other vehicles on the road.

U.S. Pat. No. 5,727,497 to Nichols Jr. discussed a flag system limited only to the hood of a vehicle.

U.S. Pat. No. 2,534,117 to Flick describes a car door flag holder, whereby, upon closing of the door a flag holder bracket will be securely clamped between the door and door jamb. Whereas, upon opening the door, the flag holder bracket will fall off.

A vehicle antenna mounting flag has been proposed by Romesburg in U.S. Pat. No. 5,735,230 and by Sectish in U.S. Pat. No. 5,590,621. Drawback in these designs is that the wind force generated by the flag is transferred to the antenna. The force may exceed the antenna's structural capabilities and thus cause the antenna to damage. Moreover, not all vehicles are equipped with a rod antenna.

Similarly, suction cup and magnetic base mounted flag masts proposed by U.S. Pat. Nos. 5,483,916, 4,574,726, 3,241,516 and 3,148,856 exhibit the disadvantage of being adversely affected by wind force, when the force is transferred to the holding bases. Should the holding base separate from where it was stuck, the disengagement may cause the invention to act as a projectile, thus creating a hazard situation to other road users. Moreover, pennants, logos, flags or indicia that depends of magnetic forces are limited to metallic vehicle panels.

It would therefore be highly desirable to provide a method and means that would overcome all aforementioned prior arts drawbacks and limitations for attaching and flying pennants, logos, flags or indicia on a vehicle.

SUMMARY OF THE INVENTION

It is therefore an object of my present invention to provide an improved, safe and simple method of attachment and display of pennants, logos, flags or indicia on a vehicle.

Further, it is the object of my instant invention to provide a means of attaching a pennant, logo, flag or indicia to a vehicle. Said means will attach a pennant, logo, flag or indicia on to the door, hood, trunk or window of a vehicle. Whereby, upon opening the door, window, hood or trunk of said vehicle, the securing means will not fall off, instead it will continue to be fixedly secured in place.

It is even further the object of my instant invention to provide a means of attaching and method of flying a pennant, logo, flag or indicia on a vehicle, such that said attachment will be secure enough and not be disengaged by wind force.

It is another object of my instant invention to provide a means of attaching and method of flying a pennant, logo, flag or indicia on a vehicle, such that said attachment will not cause the pennant, logo, flag or indicia to swing in the vertical and roll direction. Instead, swinging may be only in the horizontal direction, which allows onlookers to easily read the display including when the vehicle is in motion.

It is yet another object of the instant invention to provide a means of attaching and method of flying a pennant, logo, flag or indicia on the door, hood, trunk or window of all types of vehicles including and not limited to trucks, vans, cars, convertibles, lorries, etc.

It is yet one other object of the instant invention to provide a means of attaching and method of flying a pennant, logo, flag or indicia on all vehicles with or without an antenna.

Details of the means of mounting and method of flying the pennants, logos, flags or indicia and further objects and advantages thereof will become evident as the description proceeds and from an examination of the accompanying 3 sheets of drawings.

BRIEF DESCRIPTION OF THE DRAWINGS

The drawings illustrate preferred embodiments of the invention with similar numerical referring to similar parts throughout the several views, wherein.

DETAILED DESCRIPTION OF THE PREFERRED EMBODIMENTS

Figure 1:
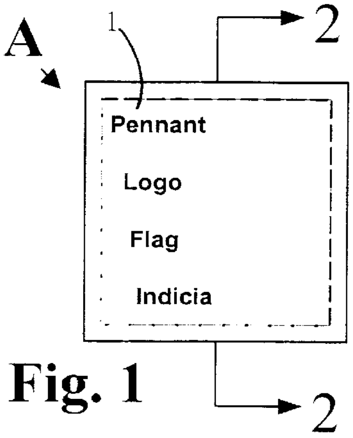
FIG. 1 is a side view of a pennant, logo, flag or indicia according to a preferred embodiment of the present invention. The pennant, logo, flag or indicia is made of one inner lining and two outer materials. The inner lining is sandwiched between the two outer materials.
Figure 2:
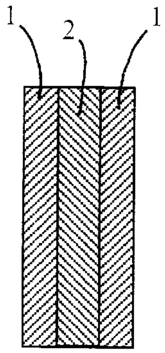
FIG. 2 is a sectional view of FIG. 1 taken along lines 2—2.
Figure 3:
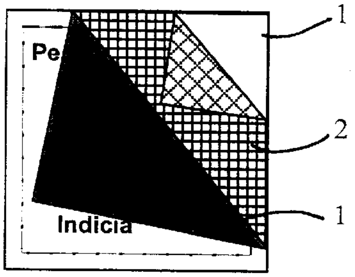
FIG. 3 is a side view of one preferred embodiment of the present invention that further reveals the inner construction of the sandwich in FIGS. 1 and 2.

In FIGS. 1 and 3, a pennant, logo, flag or indicia is made with two outside linings 1 and one inside lining 2. The outside lining is preferably made of a soft material including but not limited to cotton or nylon fabric. The inner lining 2 is fixedly secured between the outer linings 1. Gluing or sewing can be the method of securing of outer linings 1 to inner lining 2. The inner lining 2 holds the display A in an upright position, therefore, the display A will not sag during use. Display A in its entirety can also be made of a single material that will not scratch the paint of the vehicle B.

Figure 4:
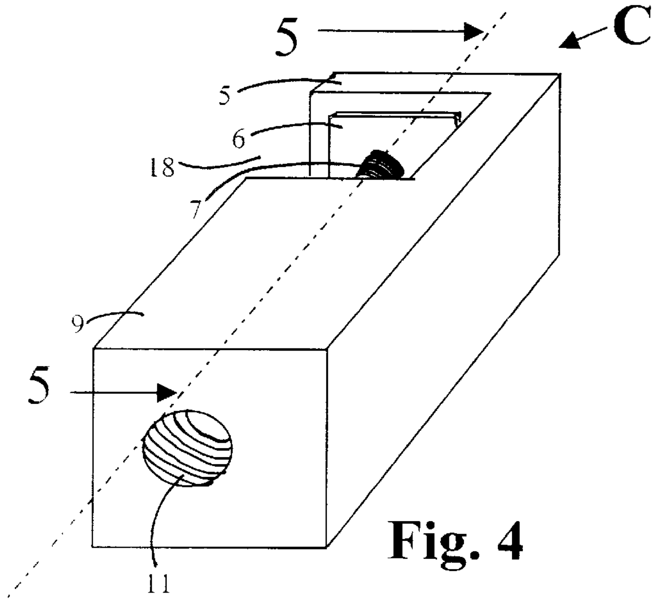
FIG. 4 is a perspective view of one preferred embodiment showing a mounting bracket of the subject invention.
Figure 5:
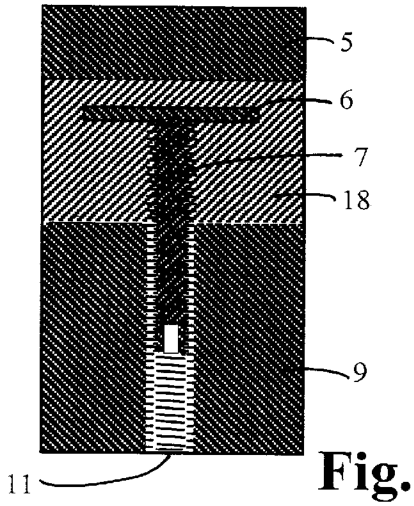
FIG. 5 illustrates a section of FIG. 4 taken along lines 5—5.
Figure 6:
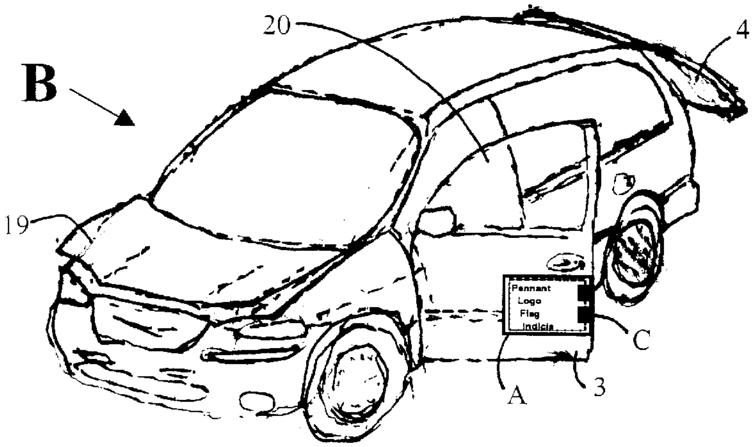
FIG. 6 is a side view illustrating one method of display of FIG. 1 using the mounting bracket shown in FIG. 4.

Illustrated in FIG. 4 is one preferred embodiment of the subject invention depicting a mounting bracket C structure adopted to be secured to the edge of a vehicle B door 3, trunk 4, hood 19 or window 20. Mounting bracket C is preferably constructed by cold pressing or injection molding. Bracket member C has two opposite bracket sections: bracket top wall 5 section and bottom thick wall section 9. Bottom thick wall section 9 has an internal threaded bore 11. Between bracket top wall 5 and bottom thick wall section 9 is a slot 18 to receive clamping plate 6, display A, and the edge of a vehicle B door 3, trunk 4, hood 19 or window 20. Clamping plate 6 may not be pivotally secured to clamping screw 7. Clamping screw 7 is operatively connected to clamping plate 6. When clamping screw 7 is operated, clamping plate 6 moves as a result. A clockwise operation of clamping screw 7 butts clamping plate 6 towards bracket top wall 5 until a display A placed between edge of door 3, trunk 4, hood 19 or window 20, and clamping plate 6 is tightly secured. The display A also serves as a resilient pad that prevents the vehicle door 3, trunk 4, hood 19 or window 20 from being scratched.

Figure 7:
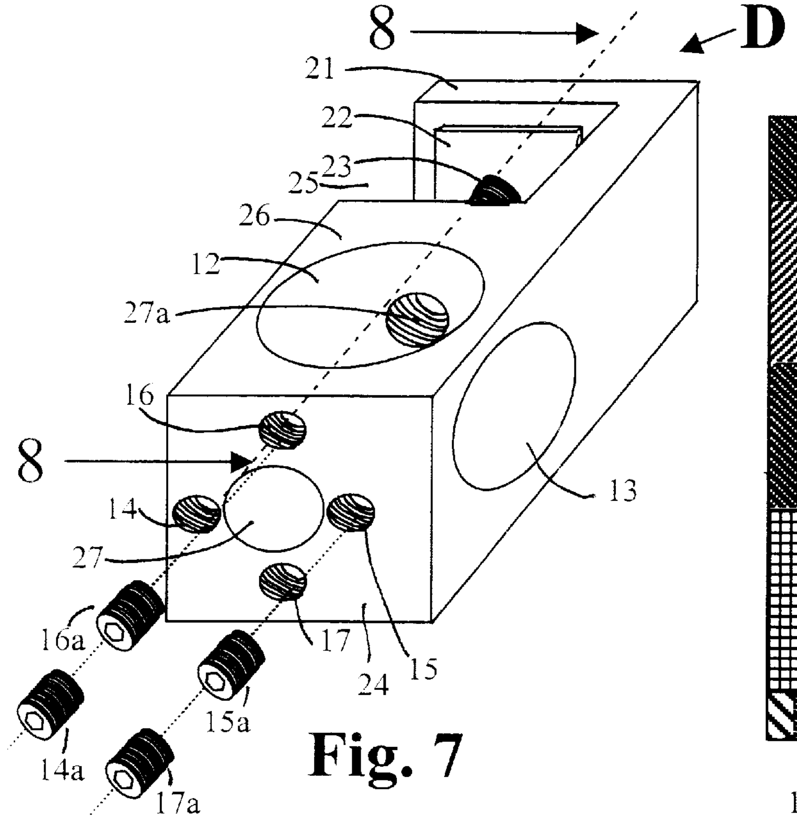
FIG. 7 is a perspective view of one preferred embodiment of a mounting bracket having two bores in two sides of said bracket such that said bores are perpendicular with each other, and the centers of said perpendicular bores intersect.
Figure 8:
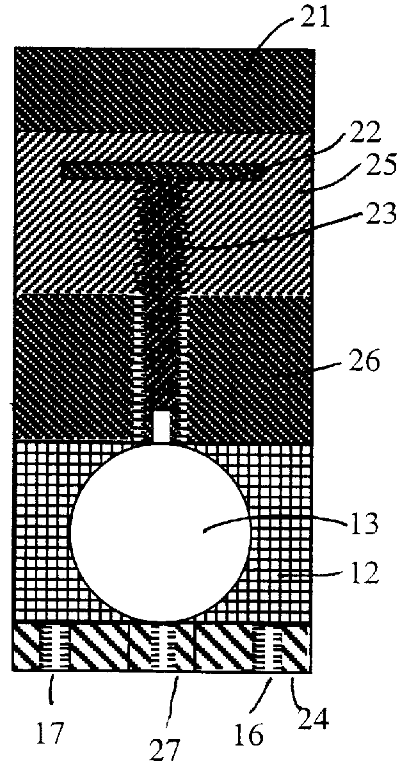
FIG. 8 illustrates a section of FIG. 7 taken along lines 8—8.
Figure 9:
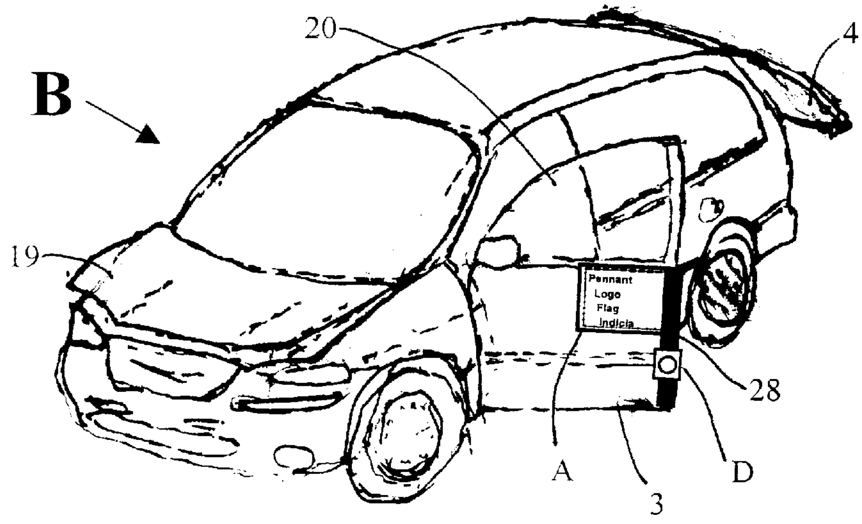
FIG. 9 is a perceptive view illustrating one method of display of FIG. 1 using one of the perpendicular bores of the mounting bracket shown in FIG. 7, and securing the assembly on the door of a vehicle.
Figure 10:
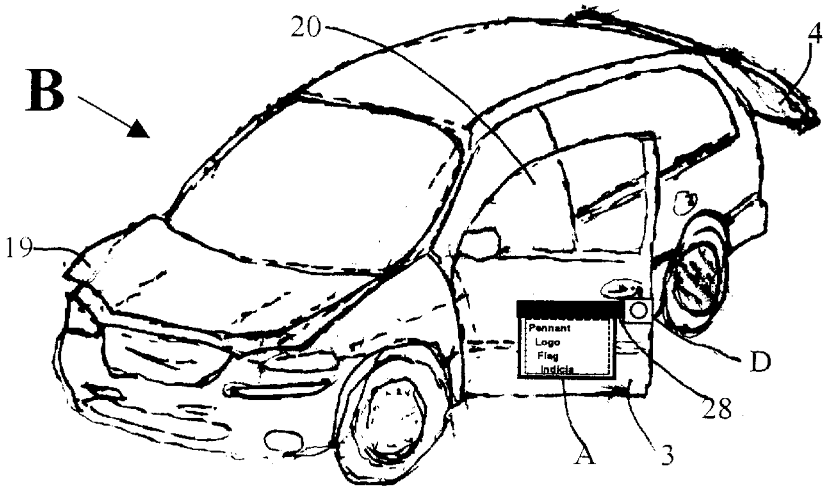
FIG. 10 is a perceptive view illustrating one method of display of FIG. 1 using a second perpendicular bore of the mounting bracket shown in FIG. 7, and securing the assembly on the door of a vehicle.
Figure 11:
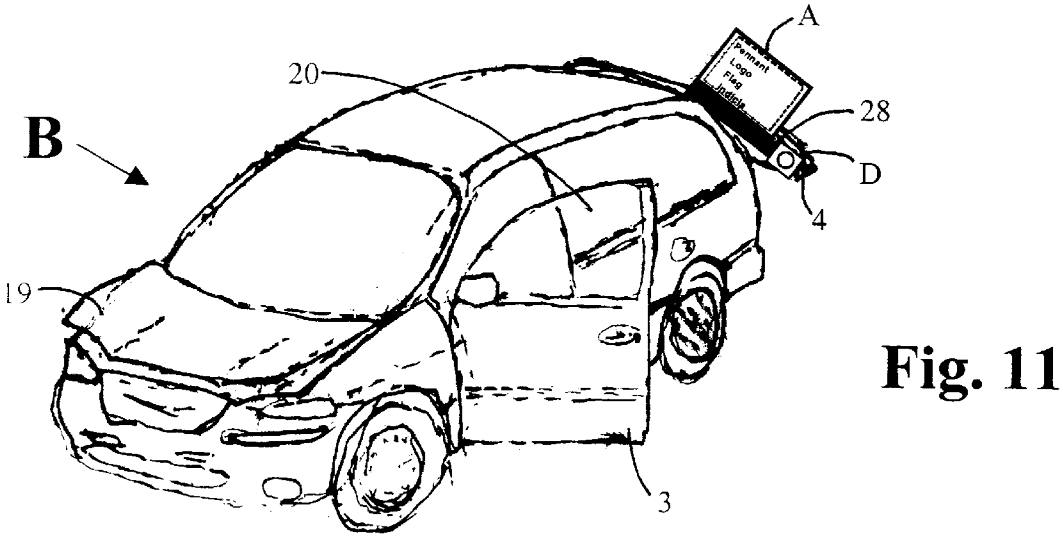
FIG. 11 is a perceptive view illustrating one method of display of FIG. 1 using a second perpendicular bore of the mounting bracket as shown in FIG. 7, and securing the assembly on the trunk or hood of a vehicle.
Figure 12:
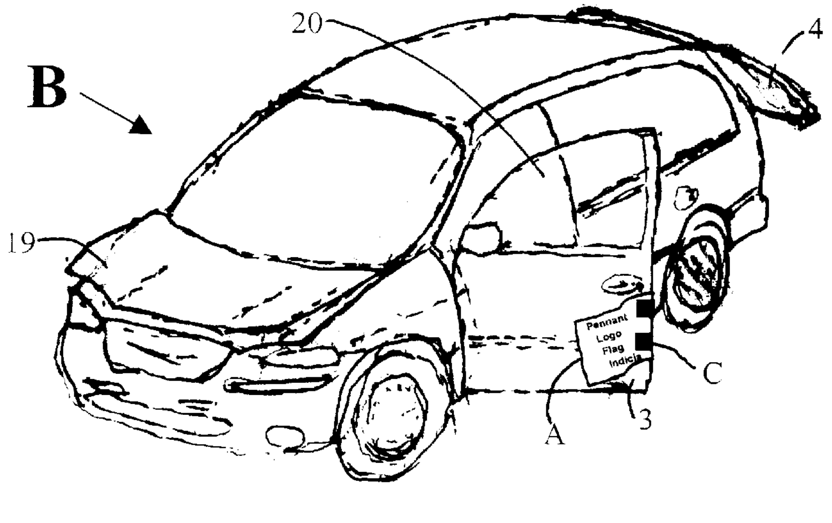
FIG. 12 is a perceptive view illustrating the use of FIG. 4 preferred embodiment to secure a regular pennant, logo, flag or indicia, said pennant, logo, flag or indicia is not reinforced and could sag.

Referring now to FIG. 7, a mounting bracket D has three sections: section bracket top wall 21 at one end, thick wall section 26 having an internal threaded bore 27*a* in the middle, and a third section at the bottom end 24 having plurality of bores 14, 15, 16 and 17. The bottom end 24 section is a continuous part of the middle thick wall 26 section. Between bracket top wall 21 and middle thick wall 26 section is a slot 25 to receive a vehicle B door 3, trunk 4, hood 19 or window 20. Slot 25 also receives clamping plate 22 and display A. Clamping plate 22 may not be pivotally secured to clamping screw 23. Clamping screw 23 is operatively connected to clamping plate 22. When clamping screw 23 is operated, clamping plate 22 moves as a result. A clockwise operation of clamping screw 23 butts clamping plate 22 towards bracket top wall 21 until bracket D is firmly secured to a vehicle B door 3, hood 19, trunk 4 or window 20. A resilient pad (not shown) may be placed in front of bracket top wall 21 and clamping plate 22 to prevent the paint on door 3, trunk 4, hood 19 or window 20 from scratching.

Further referring to FIG. 7, bores 27*a*, 14, 15, 16 and 17 are threaded and bores 12 and 13 are not threaded. Bores 12, 13 and internally threaded bore 27*a* are perpendicular with each other. Internally threaded bore 27*a* is not necessarily located in the geometric center of bracket D. Threaded bore 27*a* extends between slot 25 and bores 12 and 13. Unthreaded bore 27 extends from the two unthreaded perpendicular bores 12 and 13, towards bottom wall 24. Unthreaded bore 27 extends radially from threaded bore 27*a* towards bottom wall 24. Bore 27 and bore 27*a* are aligned bores on opposite sides of bore 12. The inner section of said aligned bores is threaded bore 27*a* and the outer section of said aligned bores is unthreaded bore 27. Unthreaded bore 27 has a diameter slightly larger than diameter of threaded bore 27*a*. Unthreaded bore 27 receives clamping screw 23 for further insertion of clamping screw 23 into threaded bore 27*a*. From bottom wall 24, the unthreaded bore 27 also receives a hand tool such as an Allen wrench (not shown) for which to operate clamping screw 23. Bore 12 or 13 receives a flag pole 28. Diameter of said flag pole 28 is slightly smaller than diameter of bore 12 or 13. Therefore, flag pole 28 fits freely inside of bore 12 or 13. Length of clamping screw 23 is such that will not impede the penetration of a flag pole 28 when inserted into bore 12 or 13. When bracket D is installed on a door 3, inserting pole 28 into bore 12 causes pole 28 to be installed vertically. Similarly, when bracket D is secured to a vehicle door 3, inserting flag pole 28 into bore 13 causes pole 28 to be installed horizontally.

Internally threaded bores 14, 15, 16 and 17 are located at bottom wall 24 of mounting bracket D as shown in FIG. 7. Internally threaded bores 14, 15, 16 and 17 receive set-screws 14*a*, 15*a*, 16*a*and 17*a* respectively. Internally thread bores 14 and 15 are positioned such that set-screws 14*a* and 15*a* respectively operatively intersect the axis of unthreaded bore 13. Also, internally thread bores 16 and 17 are positioned such that setscrews 16*a* and 17*a* respectively operatively intersect the axis of unthreaded bore 12. Set-screws 16*a* and 17*a* operatively secure flag pole 28 when flag pole 28 is inserted into unthreaded bore 12. In like manner, set-screws 14*a* and 15*a* operatively secure flag pole 28 when flag pole 28 is inserted into bore 13.

Those of ordinary skill in the art from this disclosure understand various methods of affixing the clamping screw 7 or 23 to the clamping plate 6 or 22, such as pivotally securing clamping screw 7 or 23 to clamping plate 6 or 22. However, it is not required that clamping screw 7 or 23 be secured to clamping plate 6 or 22 for the enablement of my present invention. Instead, clamping screw 7 or 23 and clamping plate 6 or 22 may not have a physical attachment until the structure C or D is in use, at which time the geometric center of clamping plate 6 or 22 is placed at the tip of clamping screw 7 or 23 when clamping screw 7 or 23 is operated. Operation of clamping screw 7 or 23 moves clamping plate 6 or 22 towards top wall bracket 5 or 21. In the process, clamping plate 6 or 22 unite with top wall bracket 5 or 21 to butt and secure the bracket C or D in place. Soft materials (not shown) may be placed in front of clamping plate 6 or 22 and top wall bracket 5 or 21.

Although the invention has been described in terms of exemplary embodiments, it is not limited thereto. Rather, the appended claims should be construed to include other variations and embodiments of the invention which may be made by those skilled in the arts without departing from the true spirit and scope of the present invention.

What is claimed, as being new and desired to be protected by Letters Patent of the United States is as follows:

1. A flag flying device comprising:

a mounting bracket having a top wall section, a middle wall section, and a slot positioned between said top wall section and said middle wall section; said middle wall section having a pole receiving bore and an unthreaded bore extending from an end wall of the middle wall section to the pole receiving bore, said unthreaded bore being perpendicular to the pole receiving bore; said middle wall section also having therein a threaded bore extending from the pole receiving bore to the slot, said threaded bore being perpendicular to the pole receiving bore and also being longitudinally aligned with the unthreaded bore; said bracket having a clamping screw received in the threaded bore; said clamping screw having a clamping plate attached thereto, wherein said clamping screw may be rotated in the threaded bore to clamp an object within the slot and between the clamping plate and the top wall section;

a flag pole removably positioned in the pole receiving slot; and a flag attached to the flag pole.

2. A flag flying device as in claim 1, wherein said middle wall section includes an additional bore for receiving said flag pole, said additional bore being perpendicular to said pole receiving bore.

3. A flag flying device as in claim 2, further comprising:

a plurality of threaded set screw bores extending from said end wall to said pole receiving bore, and a plurality of additional threaded set screw bores extending from said end wall to said additional bore, each of said set screw bores and said additional set screw bores having a set screw therein.

4. A flag flying device as in claim 1, further comprising:

a plurality of threaded set screw bores extending from said end wall to said pole receiving bore, each of said set screw bores having a set screw therein for clamping said pole in said pole receiving bore.

* * * * *